UNITED STATES PATENT OFFICE.

THEODOR LICHTENHAHN, OF BASEL, SWITZERLAND, ASSIGNOR TO ELEKTRIZITÄTS-WERK LONZA, OF GAMPEL, SWITZERLAND.

PROCESS FOR THE MANUFACTURE OF ETHYL ALCOHOL FROM ACETALDEHYDE.

1,311,824.     Specification of Letters Patent.     Patented July 29, 1919.

No Drawing.     Application filed April 25, 1918. Serial No. 230,731.

*To all whom it may concern:*

Be it known that I, Dr. THEODOR LICHTENHAHN, a citizen of the Swiss Republic, and resident of Basel, Switzerland, have invented a new and useful Process for the Manufacture of Ethyl Alcohol from Acetaldehyde, of which the following is a full, clear, and exact description.

In the manufacture of ethyl alcohol from acetaldehyde by passing a mixture of hydrogen and aldehyde vapor over a catalyst, the product is more or less contaminated with aldehyde. By the present invention this impurity may be reduced to a very small fraction if the hydrogen is used in large excess as compared with the proportion theoretically necessary. Hereby the best results are obtained when keeping the excess of hydrogen so high that the gas can so far remove the heat of the strongly exothermic reaction (nearly 300 cals. per kilo of alcohol produced) that the temperature is retained within the limits most favorable for smooth reaction without decomposition of the aldehyde, namely between 100° and 180° C. To avoid loss of hydrogen it is advisable to apply the principle of circulation to the operation.

When about a two-fold excess of hydrogen is used, a strongly evil smelling alcohol is obtained, the undesirable constituents of which, it is true, diminish later, but give place to a continuously increasing content of aldehyde; when, however, more than six-fold excess of hydrogen is used, the alcohol remains free from evil smelly products and poor in aldehyde. This excess of hydrogen removes a part of the heat of the reaction, which can be completley conducted away by using a still greater excess of hydrogen.

How great the excess should be in any particular case may be calculated from the quantity of heat developed, per unit time, from the heat lost by radiation and general external cooling, and from the heat capacity of the hydrogen in the range of temperature between the most advantageous temperature of admission and the highest temperature permissible in the apparatus.

Assuming that the gases for reaction (hydrogen and vapor of acetaldehyde) are passed at a temperature of 90° C. into a chamber containing metallic nickel, for instance, as a catalyst, and that the temperature of the chamber is to be 150° C., the excess heat of reaction may be removed from the chamber, without fear of overheating, by aid of the hydrogen, if the latter be in about a thirty-fold excess.

The alcohol can be separated by chilling the issuing vapor and the excess of hydrogen can be returned to the chamber by means of an external circulation device, or by means of an injector driven by the fresh hydrogen that must be admitted into the system.

What I claim is:

A manufacture of ethyl alcohol from acetaldehyde by reducing the latter with hydrogen in presence of a catalyst, wherein the hydrogen is used in at least six times the theoretical proportion, so that the heat of reaction is so far conducted away by the hydrogen, that the temperature in the reaction chamber is kept at that favorable for a smooth reaction without decomposition of the acetaldehyde.

In witness whereof I have hereunto signed my name this 20th day of March, 1918, in the presence of two subscribing witnesses.

THEODOR LICHTENHAHN.

Witnesses:
  H. H. DICK,
  AMAND RITTER.